(No Model.) 3 Sheets—Sheet 1.
J. HARGREAVES & T. BIRD.
APPARATUS FOR ELECTROLYSIS OF CHLORIDS, &c.
No. 571,591. Patented Nov. 17, 1896.
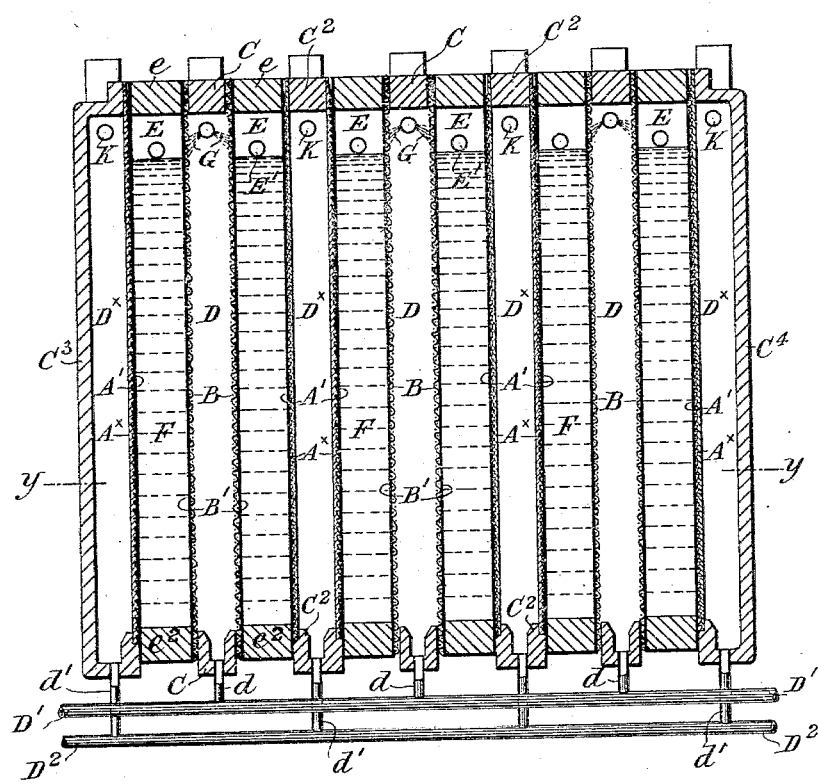
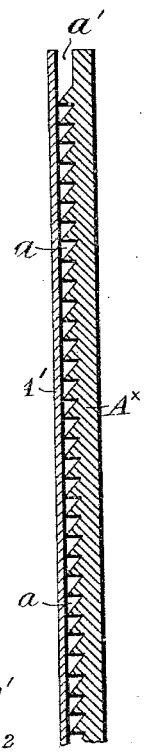
Witnesses:
Edward W Bardsley.
Isaac Sharples.
Inventors:
James Hargreaves
Thomas Bird.

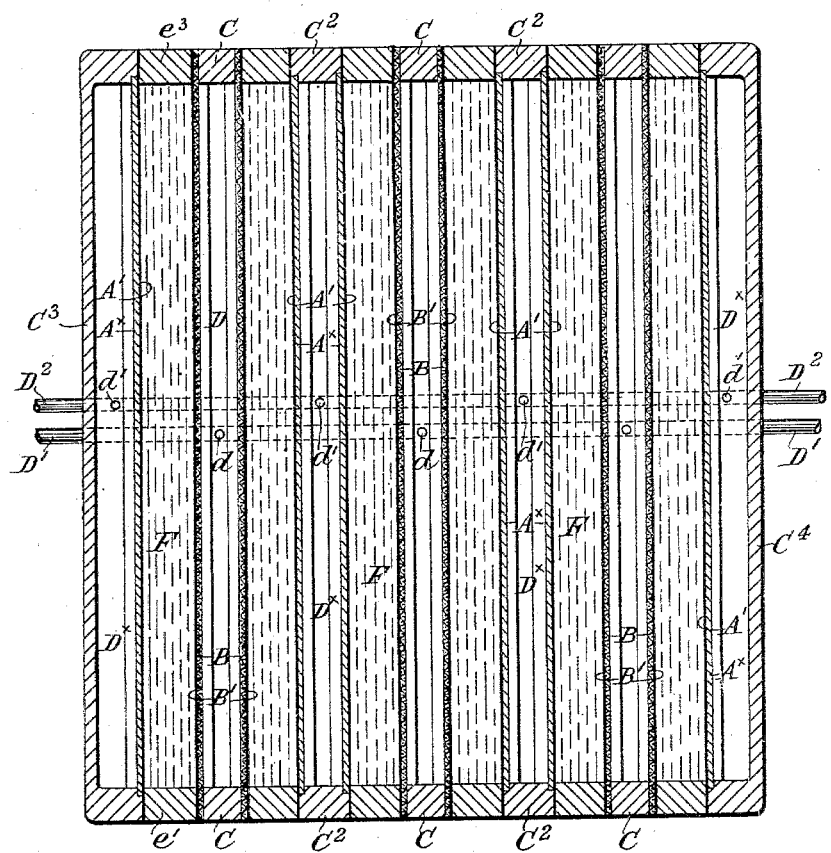

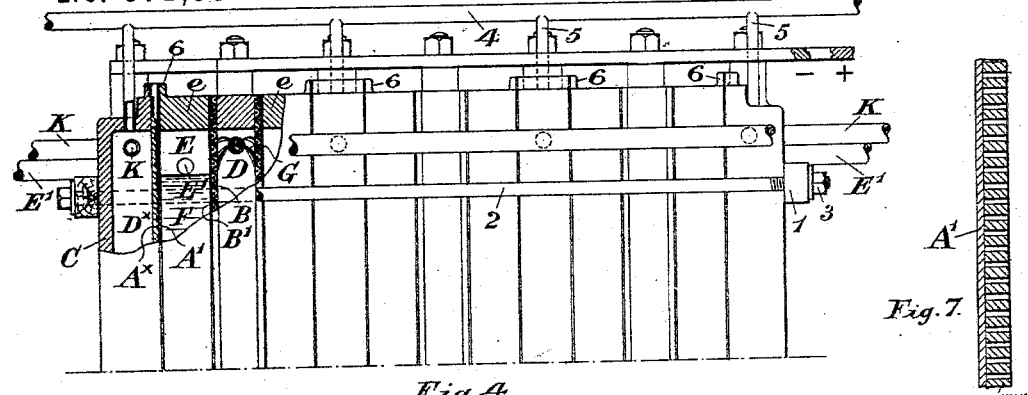
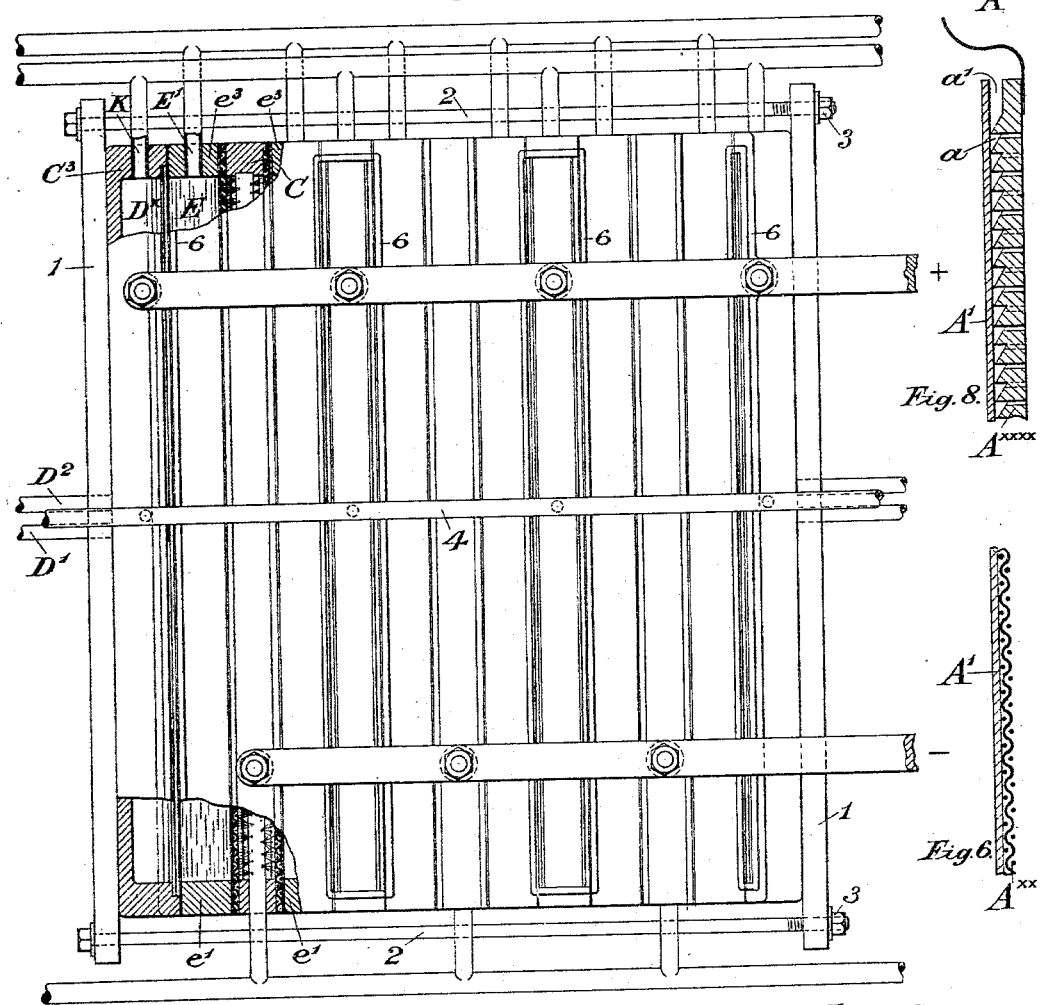

UNITED STATES PATENT OFFICE.

JAMES HARGREAVES, OF FARNWORTH-IN-WIDNES, AND THOMAS BIRD, OF CRESSINGTON, ENGLAND.

APPARATUS FOR ELECTROLYSIS OF CHLORIDS, &c.

SPECIFICATION forming part of Letters Patent No. 571,591, dated November 17, 1896.

Application filed January 4, 1894. Serial No. 490,671. (No model.)

*To all whom it may concern:*

Be it known that we, JAMES HARGREAVES, of Farnworth-in-Widnes, and THOMAS BIRD, of Cressington, near Liverpool, in the county of Lancaster, England, subjects of the Queen of Great Britain and Ireland, have invented new and useful Improvements in Apparatus for the Electrolysis of Chlorids and other Salts, of which the following is a specification.

Our invention relates to an improved construction of electrolytic apparatus for use in decomposing chlorids, iodids, bromids, nitrates, and other salts; the primary objects of the present invention being to render such apparatus less expensive to construct, more convenient to manipulate, and more compact.

In the accompanying drawings, Figure 1 is a vertical section of a cell constructed in accordance with this invention. Fig. 2 is a horizontal section on the line $y\ y$. Fig. 3 is a detail view, drawn to an enlarged scale, representing our improved form of exposed carbon anode. Fig. 4 is a partial side elevation illustrating the connections, and Fig. 5 is a side elevation of the same. Figs. 6, 7, and 8 are detail views of modified forms of anodes.

Our improved cell is specially applicable for use in effecting the decomposition of sodium nitrate and potassium iodid, all the electrodes (anodes and cathodes) being exposed. The cell is preferably built up of sections C, $C^2$, $C^3$, and $C^4$ and $e\ e'\ e^2\ e^3$, arranged in the following order: the plate $C^3$ inclosing a collecting-space $D^\times$, an exposed anode $A^\times$, a diaphragm A'; a section $e\ e'\ e^2\ e^3$ containing the electrolyte F, a diaphragm B', an exposed cathode B; a section C inclosing a collecting-space D, an exposed cathode B, a diaphragm B'; a section $e\ e'\ e^2\ e^3$ containing the electrolyte F, a diaphragm A', an exposed anode $A^\times$; a section $C^2$ inclosing a collecting-space $D^\times$, an exposed anode $A^\times$, a diaphragm A'; a section $e\ e'\ e^2\ e^3$ containing the electrolyte F, and so on, the apparatus ending with an exposed anode $A^\times$ and a second hollow plate $C^4$; but it will be understood that so long as two exposed anodes $A^\times$ alternate with two exposed cathodes B in the central part of the apparatus it is immaterial whether the electrodes at the ends of the apparatus be anodes $A^\times$ or cathodes B.

The chambers D communicate through branch pipes $d$ with the drain-pipe D'. The gaseous or volatile product obtained in the chambers $D^\times$ is led away through pipes K and treated in any suitable manner.

The pipes E' are for the admission of the electrolyte, while sprays G serve for the admission of water or a fluid to wash the product from the cathodes.

When the acid radical is volatile, as in the case of nitrates or bromids, heat may be applied to aid in expelling the acid in the form of gas or vapor. Thus in Figs. 4 and 5 we show a steam-pipe 4, having branches 5, by which steam is supplied for heating purposes, and the condensed steam serves to wash the electrode, so that as a rule no additional water is required. These steam-pipes may enter at any desired part of the shell.

Liquid resulting from condensation or filtration is conducted from the chambers $D^\times$ through branch pipes $d'$ to a main drain-pipe $D^2$.

To bind the cells together, we preferably employ wooden beams 1, placed at each end of the set of cells, these beams being connected by rods 2, having tightening-nuts 3. These rods should be placed at such a distance from the sides of the cell that no current will be induced. Each anode may be connected with the cable by its own conductor. In the drawings, Fig. 8, a strip of platinum is shown as a means of connection with the conductor, the strip being arranged along the back of each carbon plate. The anode compartments or cells being generally formed of non-conducting material, such as earthenware, glass, &c., it becomes necessary to connect the conductors to each carbon plate. The frames of the cathode-cells being generally made of metal it is sufficient to connect the conductors to the frame, in which case one wire connection serves for two cathodes.

The apparatus need only consist, however, of two recessed side plates $C^3$ and $C^4$, an exposed anode $A^\times$ and its diaphragm A,' an exposed cathode B and its diaphragm B,' and a compartment E for the electrolyte F between the diaphragms A' and B'.

The exposed anodes A$^\times$ may be of wire-gauze, as in Fig. 6, or of carbon. The carbon anode we prefer is shown in Fig. 3, the carbon plate A$^\times$ being made with numerous serrations $a$. In order to avoid injury to the carbon plate, a recess is formed in the section C$^2$ or C$^3$ or C$^4$ for holding that plate against its diaphragm, the latter only being subjected to the full pressure exerted by the bolts when the sections of the cell are secured together. Water is admitted at $a'$, either continuously or from time to time by a small trough 6, surrounding the top of the carbon anode, and runs down between the carbon A$^\times$ and the diaphragm A', thus permitting the electric current to flow easily and washing away the product from the anode. In some cases the trough 6 is not necessary, it being found that the steam generally supplies all the water needed at the anode. The carbon plate forming the exposed anode may instead of being serrated be either perforated, as in Fig. 7, or perforated and grooved, as in Fig. 8. If the carbon plates be broad, the gas may escape through perforations in the body of the carbon. If narrow, the gas may escape at the ends of the serrations or grooves. The exposed cathodes B may be of wire-gauze or of perforated sheet metal.

The diaphragms A', pertaining to the exposed carbon anodes A$^\times$, may be made in the following manner: Upon a fabric of glass fiber or of asbestos we deposit sulfate of baryta or sulfate of strontia by repeatedly dipping the fabric in a solution of baryta or of strontia and alternately into sulfuric acid or a solution of sulfate. Diaphragms so produced are, however, not restricted to use with anodes.

All the cells should be made of materials which are not liable to be attacked by the product contained in them, and as a general rule the cathode-cells may be made of metal and the anode-cells and electrolyte-cells may be made of earthenware, stone, glass, or slate.

What we claim as our invention, and desire to secure by Letters Patent, is—

1. In electrolytic apparatus, a cell having opposing porous diaphragms, and an anode and cathode respectively located in contact with the exterior surfaces of the diaphragms, substantially as described.

2. In electrolytic apparatus, a cell comprising numerous compartments containing the electrolyte, each compartment having opposing porous diaphragms forming a chamber, an anode and cathode respectively located in contact with the exterior surfaces of the diaphragms, and collecting-chambers arranged alternately with the electrolyte-compartments; substantially as described.

3. In electrolytic apparatus, a cell comprising several compartments having opposing porous diaphragms, an anode and cathode respectively located in contact with the exterior surfaces of the diaphragms, and a series of collecting-chambers arranged alternately with the electrolyte-compartments, the anode collecting-chambers being arranged alternately with the cathode collecting-chambers; substantially as described.

4. In electrolytic apparatus, a cell having opposing permeable diaphragms forming the sides thereof, and a serrated anode and a cathode respectively located against the exterior surfaces of the permeable diaphragms, said serrated anode being in contact with the permeable diaphragm only at the point of the projections left by the serrations, substantially as described.

5. In electrolytic apparatus, a cell having opposing permeable diaphragms forming the sides thereof, and a serrated anode and a cathode respectively located against the exterior surfaces of the permeable diaphragms, and means for directing a stream of fluid between the anode and its diaphragm, substantially as described.

6. For use in the manufacture of an alkali or cation or derivative product, a cell comprising a recessed plate C$^3$, a space D$^\times$ bounded by the recessed plate, a vertical exposed anode A$^\times$ and a permeable diaphragm A' next the plate C$^3$, a chamber E containing the electrolyte, a permeable diaphragm B' and vertical exposed cathode B on the opposite side of the chamber E, and a space D next the cathode B, the cell ending with a recessed plate C$^4$, substantially as herein described.

7. For use in the electrolytic apparatus, the improved manufacture of diaphragm consisting of a mineral fabric with an insoluble sulfate deposited thereon, substantially as herein described.

8. The process for manufacturing a diaphragm for use in electrolytic apparatus which consists in depositing sulfate of baryta or sulfate of strontia on a fabric of glass fiber or of asbestos by repeatedly dipping the fabric in a solution of baryta or of strontia and alternately into sulfuric acid or a solution of a sulfate.

JAMES HARGREAVES.
THOMAS BIRD.

Witnesses:
EDWARD W. BARDSLEY,
ISAAC SHARPLES.